US010594638B2

(12) United States Patent
Bostick et al.

(10) Patent No.: US 10,594,638 B2
(45) Date of Patent: Mar. 17, 2020

(54) POINT IN TIME EXPRESSION OF EMOTION DATA GATHERED FROM A CHAT SESSION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 14/621,769

(22) Filed: Feb. 13, 2015

(65) Prior Publication Data
US 2016/0241500 A1  Aug. 18, 2016

(51) Int. Cl.
H04L 12/58 (2006.01)

(52) U.S. Cl.
CPC .............. H04L 51/10 (2013.01); H04L 51/04 (2013.01)

(58) Field of Classification Search
CPC ......... H04L 51/04; H04L 51/16; H04L 51/10; G06F 17/277; G06F 17/2785; G06F 17/30244
USPC ........................................................ 704/251
See application file for complete search history.

(56) References Cited

U.S. PATENT DOCUMENTS 7,865,552 B2  1/2011  Kuhlke et al.
8,170,872 B2  5/2012  Lyle
8,782,536 B2  7/2014  Tu
9,043,196 B1* 5/2015  Leydon ............... G06F 3/04842
                                        704/4
2005/0223078 A1 10/2005 Sato et al.
2006/0170945 A1* 8/2006  Bill .................... G06F 17/30749
                                        358/1.13
2007/0070181 A1  3/2007  Oh et al.
2008/0163074 A1  7/2008  Tu
(Continued)

FOREIGN PATENT DOCUMENTS

CN  102035755 A  4/2011
CN  104333688 A  2/2015
WO  2012094725     7/2012

OTHER PUBLICATIONS

"Lexical chains as representations of context for the detection and correction of malapropisms", Hirst et al., Department of Computer Science, University of Toronto. (Year: 1995).*

(Continued)

Primary Examiner — Tonia L Dollinger
Assistant Examiner — Jonathan A Sparks
(74) Attorney, Agent, or Firm — Law Office of Jim Boice

(57) ABSTRACT

An electronic chat session monitoring device intercepts a text message from an electronic chat session. The text message is generated by a sender and addressed to an addressee. The electronic chat session monitoring device receives a current photo of the sender of the text message electronic chat session, which is taken contemporaneously with a generation of the text message by the sender and depicts an emotion of the sender while generating the text message. The electronic chat session monitoring device then transmits both the text message and the current photo of the sender to the addressee.

12 Claims, 7 Drawing Sheets

(56) References Cited

U.S. PATENT DOCUMENTS

| | | | |
|---|---|---|---|
| 2012/0069028 | A1 | 3/2012 | Bouguerra |
| 2013/0002683 | A1 | 1/2013 | Li et al. |
| 2013/0080928 | A1 | 3/2013 | Zhuang et al. |
| 2014/0022370 | A1 | 1/2014 | Sohn et al. |
| 2014/0192134 | A1* | 7/2014 | Jung .................. G06K 9/00255 348/14.02 |
| 2015/0018023 | A1* | 1/2015 | Tomii .................. G06F 17/2785 455/466 |
| 2016/0063874 | A1* | 3/2016 | Czerwinski ............. G09B 5/06 434/236 |
| 2017/0208177 | A1* | 7/2017 | Conway ................ H04M 3/523 |

OTHER PUBLICATIONS

Anonymous, "Method to manage instant messaging chat history from a thread logical view", IPCOM000214208D, Jan. 17, 2012, pp. 1-7, IP.com.

IBM, "Method and apparatus to provide emotion sensitive feature for Instant Messenger", IPCOM000173710D, Aug. 21, 2008, pp. 1-10, IP.com.

Anonymous, "A system and method for document sharing and compilation in real time through Instant Messaging Chat", IPCOM000208108D, Jun. 23, 2011, pp. 1-5, IP.com.

S. Kamberi, "A Cross-Case Analysis of Possible Facial Emotion Extraction Methods that Could Be Used in Second Life: Pre Experimental Work", Journal of Virtual Worlds Research, Managerial and Commercial Applications, vol. 5, No. 3, Dec. 2012, pp. 1-16.

J. Bailenson et al., "The Effect of Behavioral Realism and Form Realism of Real-Time Avatar Faces on Verbal Disclosure, Nonverbal Disclosure, Emotion Recognition, and Copresence in Dyadic Interaction", MIT Press Cambridge, MA, USA, Presence: Teleoperators and Virtual Environments, vol. 15, Issue 4, Aug. 2006, pp. 1-10.

D. Kurlander et al., "Comic Chat" ACM, SIGGRAPH '96 Proceedings of the 23rd annual conference on Computer graphics and interactive techniques, 1996, pp. 225-236.

H. Wang et al., "Communicating Emotions in Online Chat Using Physiological Sensors and Animated Text", ACM, CHI'04, 2004, pp. 1-4.

C. Ma et al., "A Chat System Based on Emotion Estimation from Text and Embodied Conversational Messengers", Springer Berlin Heidelberg, Entertainment Computing—ICEC 2005, Lecture Notes in Computer Science vol. 3711, 2005, pp. 535-538.

X. Zhe et al., "Text-to-Emotion Engine for Real Time Internet Communication" International Journal of Communication Systems—Int. J. Communication Systems, Jan. 2002, pp. 1-5.

Anonymous, "Selfie", Wikimedia Foundation, Inc., wikipedia.org, pp. 1-10, retrieved on Oct. 7, 2014.

C. Deamicis, "Text messaging will look boring after you try this app backed by Betaworks and Dave Morin", PandoDaily, pando.com, pp. 1-4, Dec. 17, 2013.

H. Shin et al., "A Tactile Emotional Interface for Instant Messenger Chat", Springer-Verlag, Berlin Heidelberg, Human Interface, Part II, HCII 2007, LNCS 4558, pp. 165-175.

Anonymous, "Microsoft Comic Chat", Wikimedia Foundation, Inc., wikipedia.org, pp. 1-3, retrieved Oct. 7, 2014.

A. Garas et al., "Emotional persistence in online chatting communities", Scientific Reports 2, 402, 2012, pp. 1-8.

R. Dillet, "Snapchat Adds Ephemeral Text Chat and Video Calls" AOL, Inc., techcrunch.com, pp. 1-3, May 1, 2014.

A. Neviarouskaya et al., "EmoHeart: Conveying Emotions in Second Life Based on Affect Sensing from Text", Hindawi Publishing Corporation, Advances in Human-Computer Interaction, vol. 2010, Article ID 209801, 2010, pp. 1-13.

P. Mell et al., "The NIST Definition of Cloud Computing", National Institute of Standards and Technology, Information Technology Laboratory, Version 15, Oct. 7, 2009, pp. 1-2.

China Patent Application No. 201610084540.1—Office Action dated Jun. 5, 2018.

\* cited by examiner

POINT IN TIME EXPRESSION OF EMOTION DATA GATHERED FROM A CHAT SESSION

BACKGROUND

The present disclosure relates to the field of electronic communications, and specifically to the field of electronic chat sessions. Still more specifically, the present disclosure relates to the field of conveying emotions with text messages in an electronic chat session.

In multi-party chat sessions, such as those provided by the use of smart phones, tablet computers, etc., allow one or more parties to communicate with text messages. Such chat sessions often allow a set of text messages between two or more parties to be displayed on the user interface of such communication devices, thereby providing a chronological record of the text message exchanges between the parties.

However, text alone can be ambiguous. For example, consider the text message "I am so happy". If spoken aloud, an emphasis on different words in the message can dramatically alter the meaning of the message. For example, if the word "I" is emphasized (i.e., is stressed when the phrase/sentence is spoken aloud), then the message implies that the speaker is the only person from a group who is happy. If the word "am" is emphasized when spoken aloud, then the message implies that the speaker is rebutting a challenge that he/she is not really happy. If the word "so" is emphasized when spoken aloud, then the phrase may be interpreted as being sarcastic. If the word "happy" is emphasized, then the phrase may be interpreted as the speaker truly being ecstatic.

In order to convey what the writer of the text message truly means by the text message, various approaches have been used in the prior art.

For example, U.S. Patent Application Publication No. 2013/0002683 describes a method for augmenting text messages with emotion icons (i.e., "emoticons"), which are selected from a predefined set of emoticons. However, such a system is limited to such predefined emoticons, which may or may not express the true emotion of the sender of the text message. Furthermore, emoticons are often trivialized, due to their cartoon-like features. That is, a recipient of an emoticon may consider the emoticon to be a "throw-away" addition that may or may not truly represent how the text message sender is feeling. Also, a user may select an emoticon that, unbeknown to even the sender of the text message, does not really portray how they are feeling.

Another approach to clarifying how a text message sender feels is to alter the appearance of the text message through bolding, underlining, color changing, etc. That is, the sender of the text message may simply bold or underline the first word of the text message "I am so happy" in order to emphasis that he/she, if nobody else in a group, is truly happy. Known prior art removes the task of emphasizing certain text from the user, and causes text to automatically emphasized.

For example, WIPO Patent WO 2012/094725 describes a system that takes biometric readings of the text message sender, and then modifies the appearance of the text message to reflect the emotional state of the text message sender. For example, if the text message sender is highly agitated, then the font and/or size of text may be enlarged, jagged, bolded, etc. However, like emoticons, font changes may or may not clearly convey the emotion of the text message. For example, the font style "bold" may convey excitement, anger, fear, a feeling of being hurried, etc., which are different, if not incompatible, emotions.

Thus, the prior art, either singularly or in combination, fails to provide a system that clearly represents the emotion of a sender of a text message. Furthermore, the prior art fails to provide a system that conveys the emotion of a recipient of the text message. The present invention provides one or more solutions to this long-felt need.

SUMMARY

According to an embodiment of the present invention, a method represents an emotion of a participant in an electronic chat session. An electronic chat session monitoring device intercepts a current text message from an electronic chat session. The current text message is generated by an initial sender, and the current text message is addressed to an addressee. The electronic chat session monitoring device receives a current photo of the initial sender of the current text message electronic chat session, where the current photo is taken contemporaneously with a generation of the current text message by the initial sender. The electronic chat session monitoring device, based on at least one previous photo taken of the initial sender while generating a past text message having a same contextual content as the current text message, determines whether the current photo accurately represents an emotion of the initial sender while generating the current text message. In response to determining that the current photo accurately represents the emotion of the initial sender when generating the current text message, the electronic chat session monitoring device transmits both the current text message and the current photo of the initial sender to the addressee.

In an embodiment of the present invention, the electronic chat session monitoring device, in response to determining that the current photo does not accurately represent the emotion of the initial sender when generating the current text message, transmits both the current text message and at least one previous photo of the initial sender to the addressee.

In an embodiment of the present invention, the electronic chat session monitoring device receives biometric sensor readings of the initial sender from one or more biometric sensors coupled to the initial sender. The biometric sensor readings are taken while the initial sender is generating the current text message. Based on the biometric sensor readings, the electronic chat session monitoring device determines whether the current photo accurately represents an emotion of the initial sender while generating the current text message.

In an embodiment of the present invention, the electronic chat session monitoring device, in response to determining that the current photo does not accurately represent the emotion of the initial sender when generating the current text message, rewrites text in the current text message to comport with an emotion depicted by the current photo.

In an embodiment of the present invention, the electronic chat session monitoring device generates an emotion icon that represents the emotion of the initial sender while generating the current text message. The emotion icon, which is derived from the current photo of the initial sender, is appended to the current text message.

In an embodiment of the present invention, the electronic chat session monitoring device receives a photo of the addressee, which is taken in response to the addressee opening the current text message. The electronic chat session monitoring device then transmits the photo of the addressee taken in response to the addressee opening the current text message to the initial sender.

In an embodiment of the present invention, the electronic chat session monitoring device receives a selection of a particular type of photo taken of the initial sender. The particular type of photo selected describes a particular emotion of the initial sender while generating text messages. The electronic chat session monitoring device correlates photos of the particular type of photo with text messages that have been associated with the photos of the particular type of photo. The electronic chat session monitoring device then transmits the text messages that have been associated with the photos of the particular type of photo to the requester.

In an embodiment of the present invention, the electronic chat session monitoring device creates a library of photos taken of the initial sender while generating text messages, and catalogues the library of photos according to an emotion displayed by the initial sender while generating the text messages. The electronic chat session monitoring device receives a selection of a particular type of photo from the library of photos, which describes a particular emotion of the initial sender while generating text messages. The electronic chat session monitoring device correlates photos of the particular type of photo with text messages that have been associated with the photos of the particular type of photo, and transmits the text messages that have been associated with the photos of the particular type of photo to the requester.

In an embodiment of the present invention, the electronic chat session monitoring device retrieves multiple photos taken of the initial sender while generating multiple text messages during the electronic chat session, and then determines a chronology of when the multiple photos were taken. The electronic chat session monitoring device identifies an emotion associated with each of the multiple photos, and generates an emotion arc of the initial sender during the electronic chat session based on the chronology and the emotion associated with each of the multiple photos.

In an embodiment of the present invention, the current photo of the initial sender is taken by a camera that is affixed to a device that supports the electronic chat session. The method further comprises determining, by the electronic chat session monitoring device, a distance between the initial sender and the camera when the current photo was taken. The electronic chat session monitoring device then further determines the emotion of the initial sender while generating the current text message based on the distance between the initial sender and the camera when the current photo was taken.

In an embodiment of the present invention, the electronic chat session monitoring device categorizes a background of the current photo into a particular type of environment, and then matches the particular type of environment to a particular emotion that is experienced by persons in the particular type of environment. The electronic chat session monitoring device further determines the emotion of the initial sender while generating the current text message based on the particular type of environment that describes the background of the current photo.

In an embodiment of the present invention, the electronic chat session monitoring device determines a typing speed of the initial sender while generating the current text message, and then further determines the emotion of the initial sender while generating the current text message based on the typing speed of the initial sender while generating the current text message.

In an embodiment of the present invention, the current text message is sent from a communication device that supports the electronic chat session, and the communication device has a geophysical location sensor. The electronic chat session monitoring device determines a geophysical location of the communication device while the initial sender is generating the current text message, and then further determines the emotion of the initial sender while generating the current text message based on the geophysical location of the initial sender while generating the current text message.

In an embodiment of the present invention, a computer program product represents an emotion of a participant in an electronic chat session. The computer program product comprises a computer readable storage medium having program code embodied therewith, and the computer readable storage medium is not a transitory signal per se. The program code is readable and executable by a processor to perform a method that includes, but is not limited to: intercepting a current text message from an electronic chat session, where the current text message is generated by an initial sender, and where the current text message is addressed to an addressee; receiving a current photo of the initial sender of the current text message, where the current photo is taken contemporaneously with a generation of the current text message by the initial sender; determining, based on at least one previous photo taken of the initial sender while generating a past text message having a same contextual content as the current text message, whether the current photo accurately represents an emotion of the initial sender while generating the current text message; and in response to determining that the current photo accurately represents the emotion of the initial sender when generating the current text message, transmitting both the current text message and the current photo of the initial sender to the addressee.

In an embodiment of the present invention, a communication device for representing an emotion of a participant in an electronic chat session includes an electronic communication session transceiver, a camera, a photo analysis hardware device, a geophysical positioning hardware device; monitoring server; and an emotion determination device. The electronic communication session transceiver transmits a current text message from an electronic chat session, where the current text message is generated by an initial sender, and where the current text message is addressed to an addressee. The camera captures and sends a current photo of the initial sender of the current text message to the addressee, where the current photo is taken contemporaneously with a generation of the current text message by the initial sender. The photo analysis hardware device determines, based on at least one previous photo taken of the initial sender while generating a past text message having a same contextual content as the current text message, whether the current photo accurately represents an emotion of the initial sender while generating the current text message. The geophysical location sensor determines a geophysical location of the communication device while the initial sender is generating the current text message. The emotion determination device further determines the emotion of the initial sender while generating the current text message based on the geophysical location of the initial sender while generating the current text message. The electronic communication session transceiver, in response to the photo analysis hardware device and the emotion determination device determining that the current photo accurately represents the emotion of the initial sender when generating the current text message, transmits both the current text message and the current photo of the initial sender to the addressee.

The presently disclosed system thus provides a technological advantage over the prior art, in that it improves the efficiency and accuracy of conveying the emotions of senders and/or recipients of text messages. More specifically, without the teachings of the present disclosure, many, if not most, text messages would be ambiguous, and thus subject to misinterpretation.

DETAILED DESCRIPTION

Figure 1:
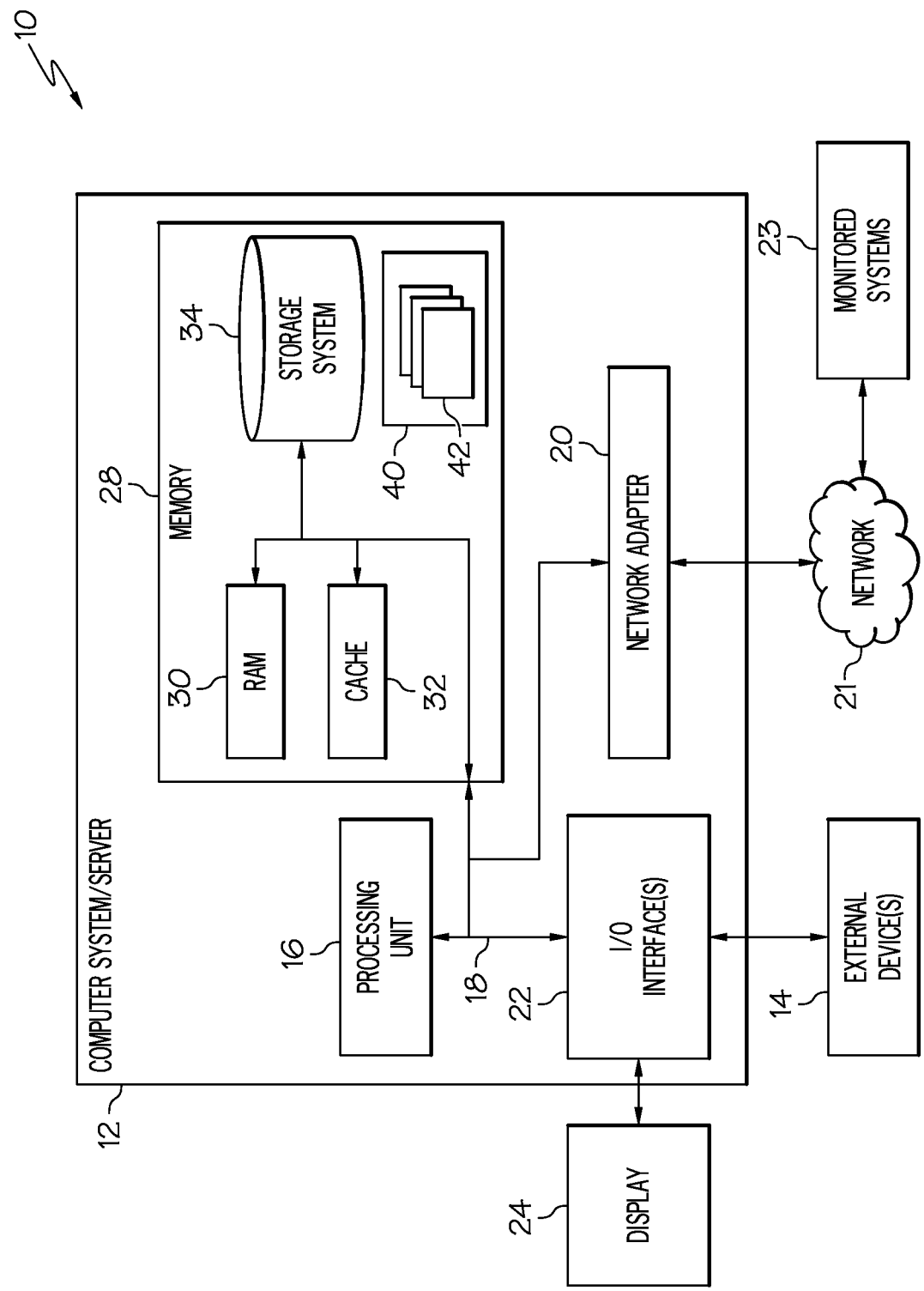
FIG. 1 depicts a cloud computing node according to an embodiment of the present disclosure.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present disclosure, external devices 14 utilize the architecture of the computer system/server 12 shown in FIG. 1. Similarly, the architecture of computer system/server 10 can be implemented in the monitored systems 423a-423b and/or the electronic chat session monitoring device 412 shown in FIG. 4.

As further depicted in FIG. 1, the computer system/server 12 may be coupled to a network 21, which may be wired or wireless, via the network adapter 20. Coupled to the network 21 are one or more monitored systems 23, which exchange text messages as described herein.

Figure 2:
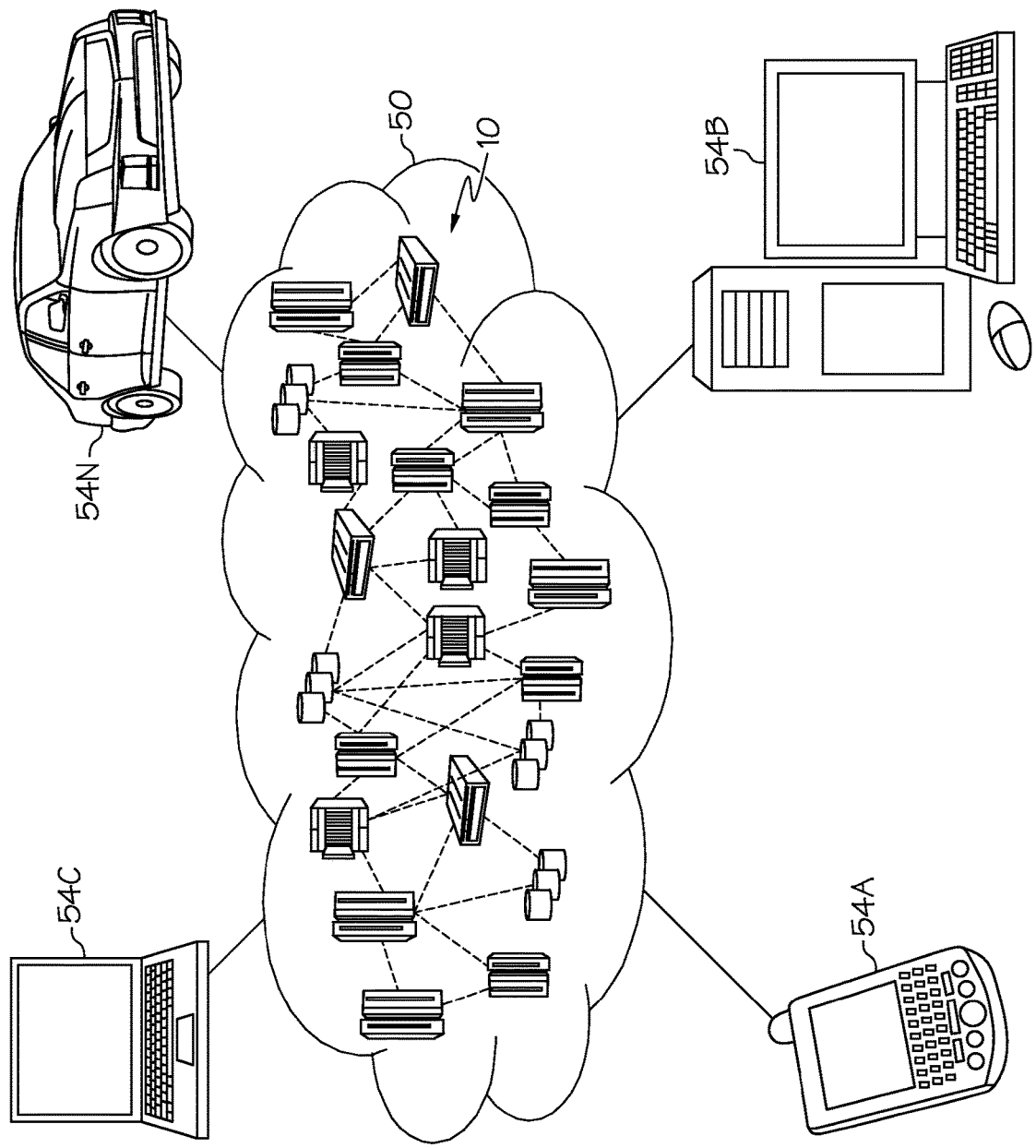
FIG. 2 depicts a cloud computing environment according to an embodiment of the present disclosure.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
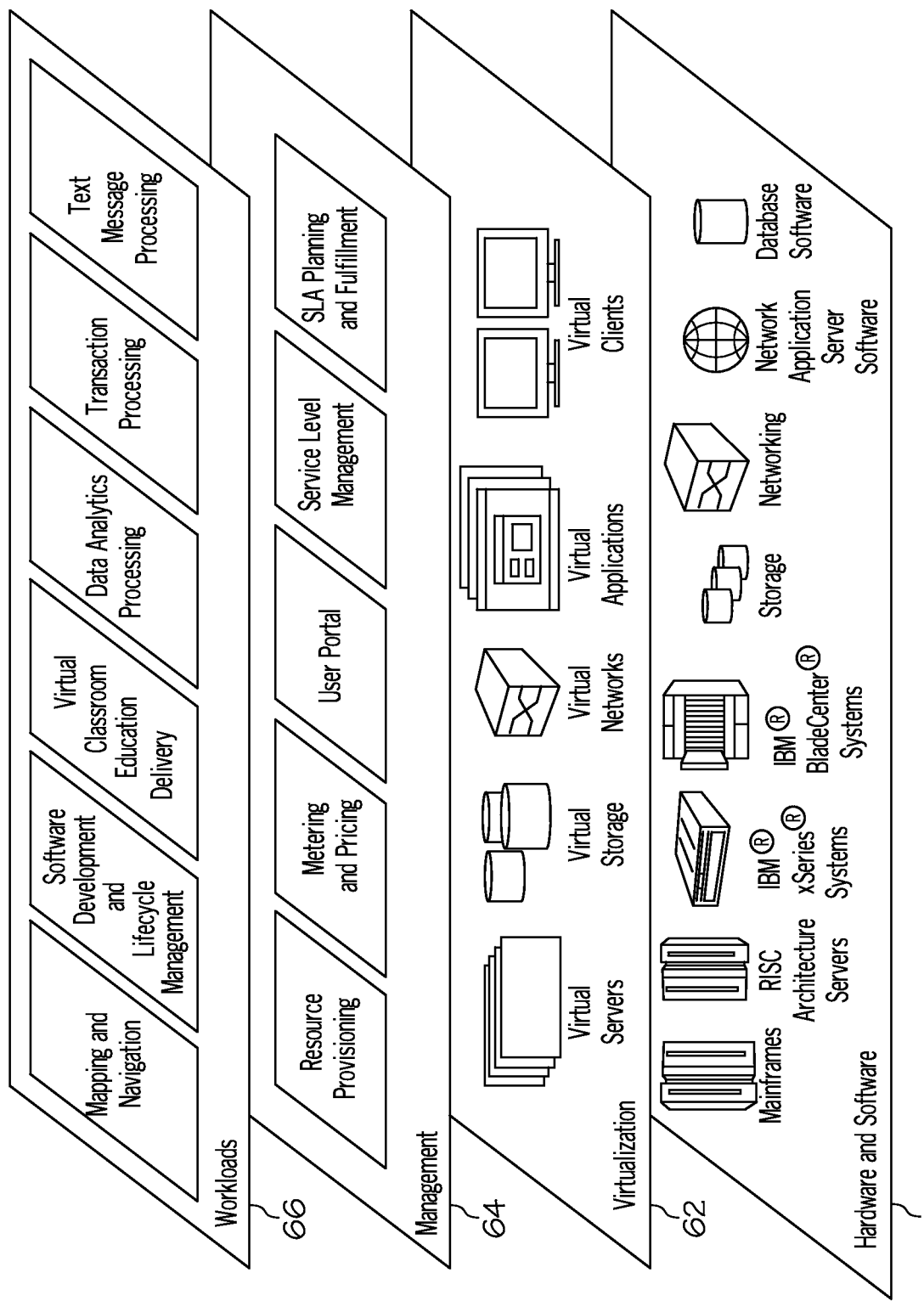
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and representing emotions of participants in an electronic chat session, as described herein, and as represented by the "Text Message Processing" found in workloads layer 66.

Figure 4:
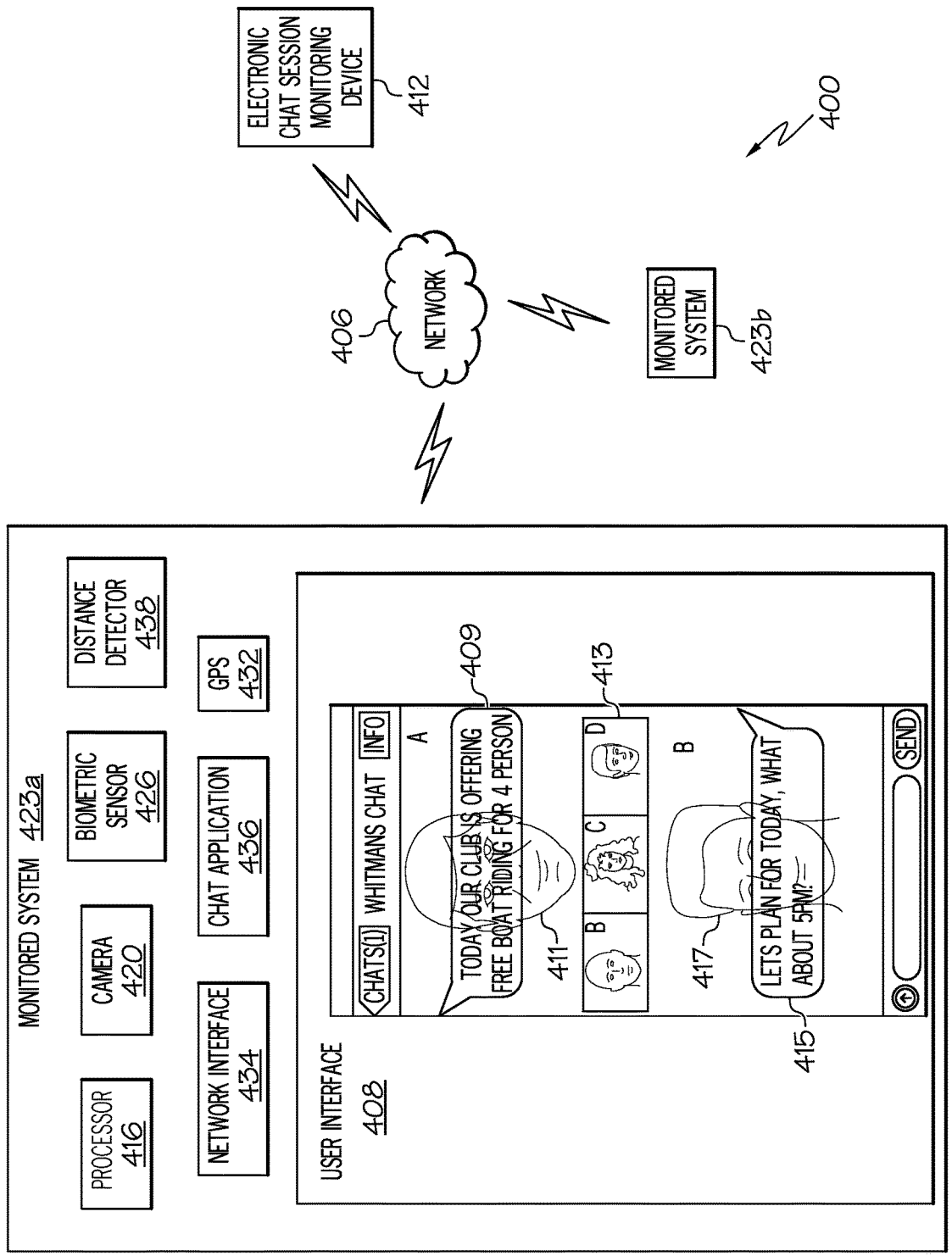
FIG. 4 illustrates an exemplary system in which the present invention may be utilized.

With reference now to FIG. 4, an exemplary system 400 depicts the technical characteristics and/or interoperability of various new and novel technical features not found in the prior art, and in which the present invention may be utilized. More specifically, the elements depicted in FIG. 4 and further described with respect to operations depicted in FIGS. 5-7 solve the problem of emotionally ambiguous text messages. The present disclosure solves this problem through the use of visual indicators that clarify the tone of the text messages.

An electronic chat session monitoring device 412 (analogous to computer system/server 12 shown in FIG. 1), such as a server, is able to communicate with one or more monitored systems analogous to monitored systems 23 in FIG. 1, such as the depicted monitored systems 423a-423b (e.g., a smart phone, a personal digital assistant, a tablet computer, etc.) via a network 406, which may be wired (e.g., the Internet), wireless (e.g., a Wi-Fi system, a cellular network), and/or a combination of both. The electronic chat session monitoring device 412 is able to communicate with the network 406 via a network interface (not shown) in the electronic chat session monitoring device 412, just as the monitored systems 423 are able to communicate with the network 406 via a network interface (depicted as network interface 434 in monitored system 423a).

As described herein, electronic chat session monitoring device 412 is able to monitor smart phones and other types of communication devices (i.e., monitored systems 423a-423b), in order to augment text communications with photographic evidence of an emotion of a sender/recipient of such text communications. However, as shown in FIG. 4, each monitored system 423a-423b includes a local processor 416. Therefore, in one or more embodiments, a monitored system 423 is able to self-monitor itself and to augment text messages sent/received thereto with photos of the sender/recipient of the text messages using a camera 420 that is part of the monitored system 423, rather than relying on the electronic chat session monitoring device 412 to perform this operation. That is, the monitored system 423 can be its own electronic chat session monitoring device in one or more embodiments of the present invention.

Exemplary monitored system 423a includes a user interface 408, which may display a chat session. The terms "chat session" and "electronic chat session" are used interchangeably herein to describe electronic communication sessions, such as text messaging, e-mail, etc., that allow two users/devices to communicate via text over a network.

As described herein, the present invention provides a "point in time" expression that represents an emotion of a text message sender and/or recipient when the text message is sent/received. User interface 408 depicts an exemplary multi-party chat session among an initial sender A and multiple recipients/respondents B-D.

As depicted in the example shown in FIG. 4, User A sent chat content 409 to his friends B, C and D with a photo 411 of User A that was taken while User A typed and/or sent chat content 409. That is, User A sent both the chat content 409 as well as the appended/associated photo 411, such that photo 411 can show the facial expression (and thus emotion) of User A when he/she sent the chat content 409. As depicted, photo 411 shows User A with a happy expression on his face. Note that photo 411 is a photograph, and not an emotion icon (emoticon), clip art, etc. Rather, photo 411 is a photo that was actually taken of User A when User A created/sent chat content 409. As depicted in FIG. 4, photo 411 underlies (i.e., is in the background of) the chat content 409, thus showing how happy User A was when he created/sent chat content 409. Thus, in this example, the chat content 409 is overlaid over the facial photograph (photo 411) of the sending party (User A).

Once the receiving parties (recipient B, recipient C, and/or recipient D) have received the chat content 409 (along with the underlying photo 411), their facial feedback is also captured in order to update the chat session. That is, when recipients B-D open/read the chat content 409, their faces will register certain emotions, which are captured in photos 413. As depicted in photos 413, User B is surprised after reading chat content 409, while the faces of Users C-D register happiness. Note that user B has now replied to the chat content 409 with both his own text message 415, as well as his photograph 417 that was taken when he generated/sent his text message 415 to User A. As depicted in FIG. 4, the text message 415 from User B is overlaid over his photograph 417, thus associating text message 415 with photograph 417 of User B, thereby showing his happy mood.

As depicted in FIG. 4, there are no photos of Users A, C, or D shown in response to User B's text message 415. This indicates either that Users A, C, or D have not received/opened/read text message 415 from User B, or else Users A, C, or D have disabled the feature of recording their facial expressions when receiving text/chat messages.

As described herein, a chat application (e.g., chat application 436 shown in FIG. 4) allows a user to configure a chat feature to enable "shared expressions" (i.e., "point in time" expressions) to be sent with each message sent and to capture expressions for each message received. In one or more embodiments of the present invention, this is a configurable option. If enabled, the configurable option allows the user to share the expressions through photography or a video snippet. In allowing photography or video, the user is giving the application permission to use an installed camera (e.g., camera 420) on the chat device (e.g., monitored system 423*a*) to take a photograph or a video snippet each time they send a chat message and/or each time they receive a chat message. An additional configuration is available in the event the user disabled photography or video. In this case the user may choose to attach an emotion icon to each message sent or received, as described in further detail below.

If the "share expressions" feature is enabled, then the user's device camera (i.e., camera 420 shown in FIG. 4) captures a photograph or video based on the user's configuration at the time the user sends/receives a chat/text message.

The captured photograph or video will accompany the chat message content as additional data and be available to all parties of the multi-chat who have "accept expressions" options enabled. The multi-chat participants may view the shared expression by clicking the expressions pane to see all expressions shared, by hovering over the sent content or by viewing the expression as a watermark to the chat content. These options are configurable for all users of the chat application. That is, in one embodiment, only by enabling the "accept expressions" option to allow a message sender to see the facial reaction to the message will the sender see the recipient's facial reaction. This allows users to protect their unfiltered facial responses from being seen by any other person.

Upon receipt of chat content, the chat application will capture a photograph or video of the receiver to capture their expression. In one embodiment of the present invention, the expression of each recipient may be seen in the expressions pane, as a hover over the content related to the expression or as expression watermarks for the related content, in the case of a photograph or emotion icon. That is, if a recipient of a chat/text message hovers over the chat/text message, then the underlying photo of the chat/text message sender (taken at the time the chat/text message was created/sent) will appear. This embodiment prevents the user interface 408 from becoming overloaded with photos or chat/text message senders/recipients.

In the event photography and video are disabled but emotion icons are enabled, the chat application shall request an emotion icon selection each time a message is sent or received, as described in further detail below by translating the photograph into an emoticon. This input is captured prior to the user message being sent and immediately after a message is received. In this embodiment the captured photograph or video is translated into a series of emotion icons. These emotion icons are sent to the chat parties in lieu of or at the configurable request of the chat participants.

As described herein and described in further detail below, to translate the photograph or video into an emotion icon (emoticon), the chat application 436 compares a library of available emotion icons to the image at the time of capture and chooses an appropriate emotion icon based on recognition protocols. Once one or more appropriate emotion icon(s) are chosen, the chat application sends those emotion icon(s) as shared expressions.

Shared and received expressions also serve as confirmation of receipt of the content as the expression at the time of receipt is recorded by the chat application. This serves as a record of who has reviewed chat content.

Figure 5:
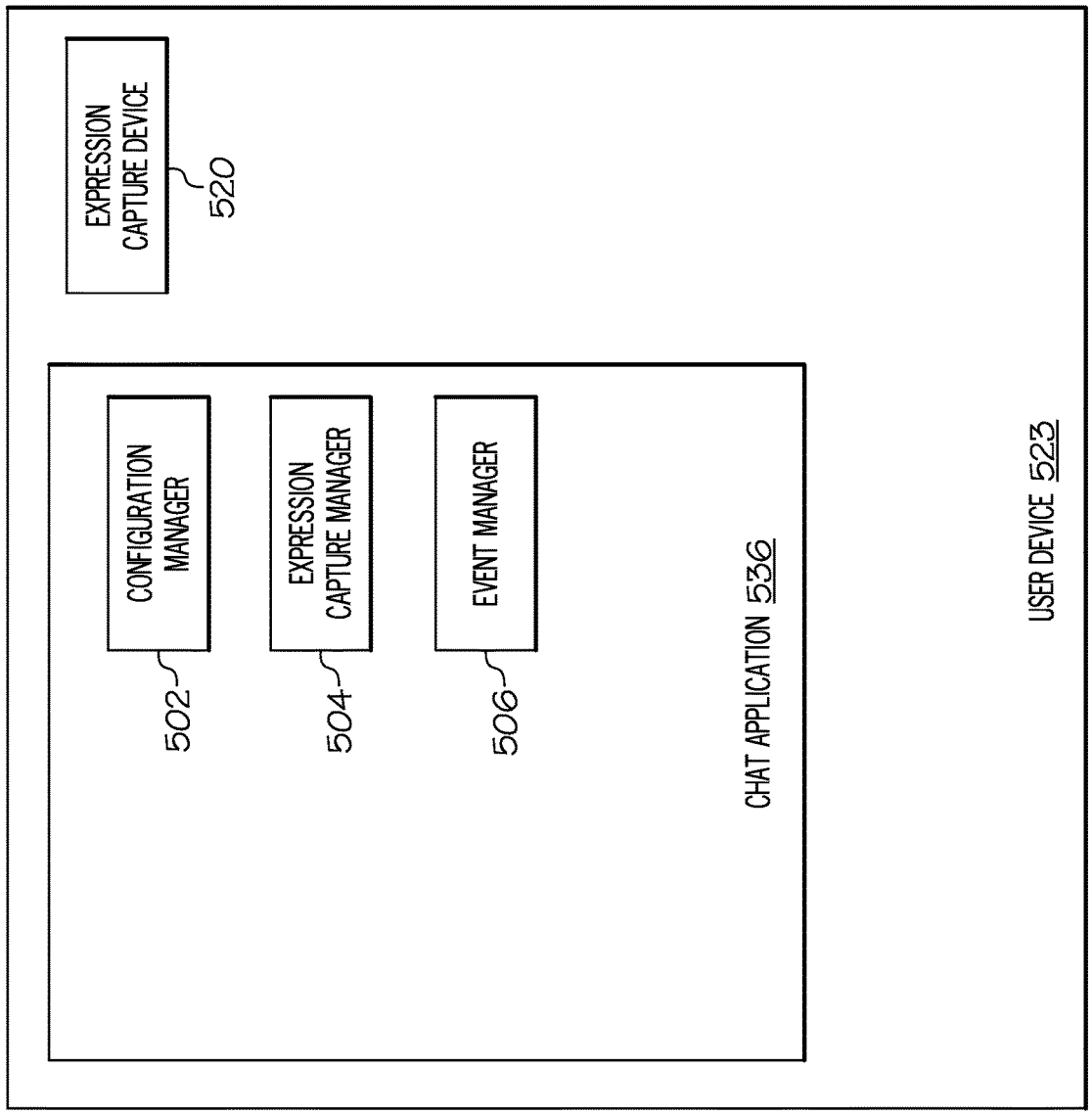
FIG. 5 depicts logical components used by the present invention to augment a text message with photographs of a sender and/or recipients of a text message in accordance with one or more embodiments of the present invention.

With reference now to FIG. 5, logical components used by the present invention to augment a text message with photographs of a sender and/or recipients of a text message in accordance with one or more embodiments of the present invention are presented. Within the user device 523 (analogous to the monitored system 423*a* shown in FIG. 4) is a chat application 536 (analogous to chat application 436 shown in FIG. 4) that is presented on a user interface such as the user interface 408 shown in FIG. 4. Within the chat application 536 is a configuration manager 502 that allows the user of the user device 523 to opt in or out of the expression/emotion capturing features described herein by providing selection boxes/icons (not shown) on the user interface. The expression capture manager 504 determines which photos, if any, are appended to a text message. An event manager 506 captures an expression history for a particular chat session, as described below. The expression capture device 520 shown in FIG. 5 is a camera (e.g., camera 420 shown in FIG. 4) that is affixed to the user device 523.

Figure 6:
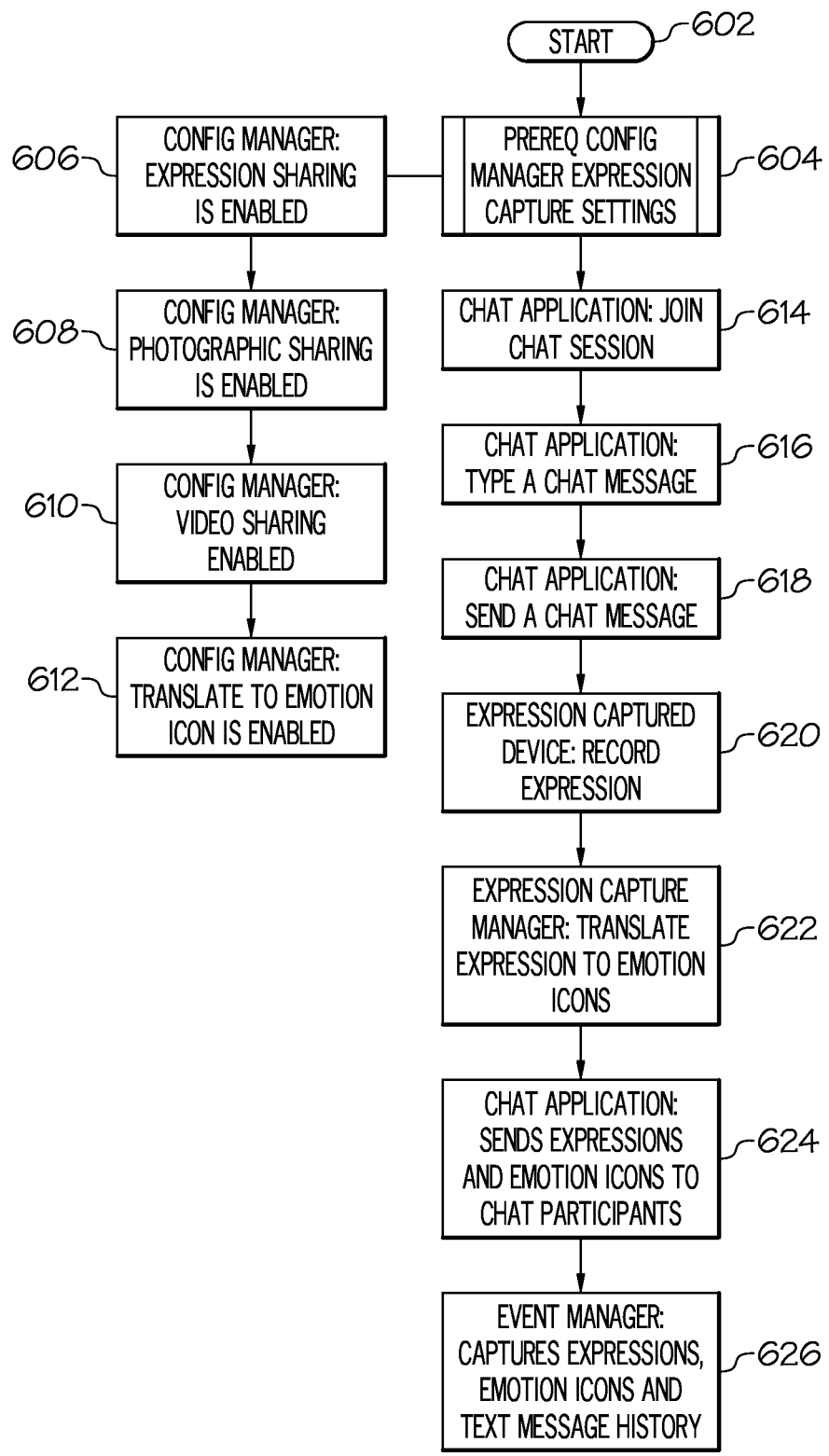
FIG. 6 illustrates various actions and/or components of the present invention to convey an emotion of a text message sender along with the text message.

With reference now to FIG. 6, various actions and/or components of the present invention to convey an emotion of a text message sender along with the text message are presented.

After initiator block 602, a configuration manager (e.g., configuration manager 502 shown in FIG. 5) sets settings for if/when photos will be captured and/or transmitted upon generation/transmission/receipt of a text/chat message. As described in blocks 606-612, the configuration manager determines whether or not the user(s) wish to enable photo/expression sharing when they send/receive chat/text messages (block 606), whether or not cameras are activated for taking photos when chat/text messages are sent/received (block 608), whether or not video sharing is enabled between communication devices (block 610), and whether or not photographs of the senders/recipients of chat/text messages are to be translated into emotion icons (block 612).

Once the configuration manager sets up the system as described in blocks 606-612, a chat session is initiated (block 614). An initial text message sender types in (block 616) and sends a chat/text message (block 618). A camera records the sender's facial expression when he sends the chat/text message (block 620) and sends it along with the chat/text message to a recipient.

Optionally, the photograph of the sender/recipient of the chat/text message is translated into an emotion icon (block 622). This translation is performed by mapping facial features (e.g., using facial point mapping, which is digitized to represent a particular facial appearance) to certain emotion icons. That is, the system first determines that the facial features (based on lighting, eyelid position, mouth position, etc. that have been digitized) match a particular emotion, according to a library of digitized facial features. This particular emotion is then matched to an emotion icon that has been created to depict this same emotion. The matching emotion icon is then sent to the chat participants (block 624). The event manager (e.g., event manager 506 shown in FIG. 5) then captures the expressions, emotion icons, and text message history of the chat session (block 626).

Figure 7:
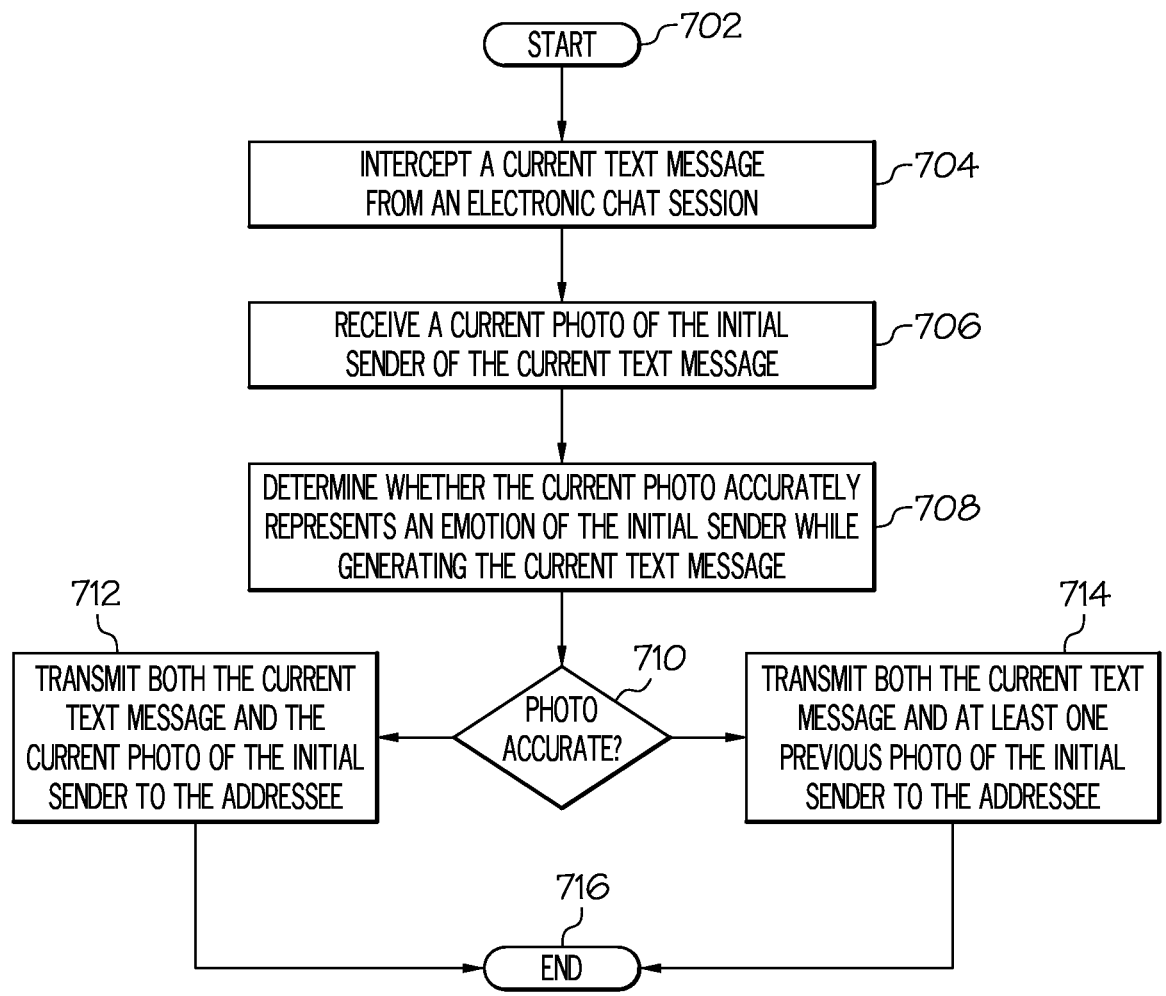
FIG. 7 is a high level flow-chart of one or more operations performed by one or more processors and/or other hardware devices to represent an emotion of a participant in an electronic chat session.

With reference now to FIG. 7, an additional flow-chart of one or more operations performed by one or more processors or other hardware devices to represent an emotion of a participant in an electronic chat session is presented.

After initiator block 702, an electronic chat session monitoring device intercepts a current text message from an electronic chat session. This current text message is generated by an initial sender, and is addressed to an addressee. For example, in FIG. 4 chat content 409 is a current text message that is addressed to Users B-D. The electronic chat session monitoring device may be a third party device (e.g., the computer system/server 12 in FIG. 1 and/or the electronic chat session monitoring device 412 shown in FIG. 4), or it may be the device that is being used to create and transmit the current text message, such as the monitored system 423a shown in FIG. 4.

Returning now to FIG. 7, as described in block 706 the electronic chat session monitoring device receives a current photo of the initial sender of the current text message electronic chat session. This current photo is taken contemporaneously with a generation of the current text message by the initial sender. In one embodiment, the current photo is taken of the initial sender (i.e., a person) while the initial sender is drafting the current text message. In another embodiment, the current photo is taken just as the initial sender sends/transmits the current text message to one or more addressees.

As described in block 708 of FIG. 7, the electronic chat session monitoring device determines, based on at least one previous photo taken of the initial sender while generating a past text message having a same contextual content as the current text message, whether the current photo accurately represents an emotion of the initial sender while generating the current text message. That is, the electronic chat session monitoring device compares the current photo (taken while the user is generating and/or sending the current text message) to a previous photo of the initial sender that shows the same facial characteristics of the initial sender when he/she drafted a similar text message in the past. For example, assume that the user (i.e., the initial sender) had drafted a text message that contained good news, and the photo of the user showed him/her smiling. Points on the user's face are mapped and digitized to generate photo metadata that describes the person in the photo as being happy. This same process is applied to the current photo. If the digitized points on the user's face from the current photo match those in the previous photo that was deemed to show the person as being happy, then the system concludes that the user/person is likewise showing happiness in the current photo.

While it may seem intuitive that all persons show happiness (or other emotions) on their faces in the same way, this is not the case. Some persons, due to injuries or medical conditions or stylistic preferences, may exhibit an expression of happiness that may look like anger on another face. However, one or more embodiments of the present invention overcome this problem by standardizing facial expressions for particular emotions for a specific person based on historical photos, as just described.

In query block 710 of FIG. 7, a query is made as to whether or not the current photo (taken while the user/sender was creating/sending the current text message) accurately captures the emotion of the initial sender when generating/sending the current text message. The determination of whether or not the current photo shows an appropriate emotion is based on the content of the text message. For example, if the text message contained sad news, then a photo of the text sender showing happiness would be inappropriate. The "happy" photo may have been the result of the user temporarily trying to "put on a positive face" in light of the sad news, but could be construed as being terribly insensitive in light of the content of the text message. Thus, in one or more embodiments of the present invention and as described herein, the system takes proactive steps to ensure that such a misstep does not occur.

Thus, as described in block 712 of FIG. 7, if the photo of the user/sender taken while the user/sender is generating/sending the text message shows an appropriate facial expression for the content of the text message, then that photo is included in the transmission of the text message (as shown by elements 409 and 411 in FIG. 4)

However, if the photo of the user/sender taken while the user/sender is generating/sending the text message is inappropriate for the content of the text message, then that photo is not included in the transmission of the text message. Rather, an earlier photo of the user showing the appropriate facial expression for the content of the text message is sent along with the text message to the addressee(s), as described in block 714.

Thus, in one embodiment the electronic chat session monitoring device, based on at least one previous photo taken of the initial sender while generating a past text message having a same contextual content as the current text message, determines whether the current photo accurately represents an emotion of the initial sender while generating the current text message. In response to determining that the current photo accurately represents the emotion of the initial sender when generating the current text message, the electronic chat session monitoring device authorizes the transmission of both the current text message and the current photo of the initial sender to the addressee.

However, if the current photo does not accurately represent the emotion of the initial sender when generating the current text message, then the electronic chat session monitoring device transmits the current text message with at least one previous photo of the initial sender to the addressee.

The flow-chart shown in FIG. 7 ends at terminator block 716.

In one embodiment of the present invention, the electronic chat session monitoring device receives biometric sensor readings of the initial sender from one or more biometric sensors coupled to the initial sender. The biometric sensor readings are taken while the initial sender is generating the current text message. The electronic chat session monitoring device, based on the biometric sensor readings, determines whether the current photo accurately represents an emotion of the initial sender while generating the current text message. For example, assume that the generator/sender of the chat/text message is using a smart phone that includes biometric sensors (e.g., biometric sensor 426 shown in FIG. 4), such as a pulse monitor (e.g., a pressure/sound sensor that detects the pulse of the holder of the smart phone), a skin sensor (e.g., a resistance sensor that measures a galvanic skin response from the user/holder sweating), pupil dilation detector (e.g., a camera that captures an image of the user/holder's eye pupils to indicate various emotions that are known to be associated with pupil dilation and/or pupil contraction), etc.

Readings from such biometric sensors are used to correlate the actual emotion of the user/sender of the message. Note that the user/sender may not even be aware of his/her current emotion. That is, the user/sender may think that he/she has no emotional response to the content of his/her text message, but his/her biometrics, which are not easy to mask, will indicate the true emotion of the sender/user.

As shown in FIG. 4, photos that capture emotions can be of both recipients as well as senders of text messages. For example, a recipient of truly happy news may show biometric indicators that may not appear in the photo (e.g., pulse, skin changes, etc.), and the photo may not be a true representation of the recipient's mood. For example, the recipient may have a severe headache that causes his/her face to grimace, even though he/she is made happy by the content of the text message (e.g., "Happy Birthday!"). Use of the biometric data prevents the recipient from automatically sending a responsive photo that does not accurately reflect his/her response to the chat/text message, such that a substitute photo (showing true happiness) is sent instead in a response to the text message.

In one embodiment of the present invention, the electronic chat session monitoring device, in response to determining that the current photo does not accurately represent the emotion of the initial sender when generating the current text message, rewrites text in the current text message to comport with an emotion depicted by the current photo. For example, assume that the sender/generator of the current text message sends out a chat/text message saying "I am so piqued about your new job!" The sender/generator may be familiar with the vernacular phrase "pique one's interest", meaning that their interest is aroused, but does not realize that "piqued" actually means to be resentful at being slighted. The present invention thus compares the sender's photo (showing genuine happiness) with the definition of "piqued", and concludes that "piqued" is a malapropism (incorrectly used word). Thus, the system replaces "piqued about" with "interested in", such that the amended responsive chat/text message that is actually sent reads "I am so interested in your new job!"

In one embodiment of the present invention, the electronic chat session monitoring device generates an emotion icon that represents the emotion of the initial sender while generating the current text message, where the emotion icon is derived from the current photo of the initial sender, and then appends the emotion icon to the current text message. For example, assume that the system (e.g., chat application 436 in FIG. 4) receives a digitized photo of the generator/sender of the chat/text message that is interpreted as the generator/sender being happy. If the generator/sender wanted to send an emotion icon (i.e., an emoticon) with the chat/text message (without or without the current photo), the user could select from a previously developed selection of emoticons. However, the user-selected emoticon may or may not accurately describe his/her true emotion, as discerned by the text of the message, biometric sensors, a chat history of the session (see below), etc. Thus, the system generates and/or selects an emoticon that accurately depicts the true emotion of the generator/sender of the chat/text message based on the photo of the sender/recipient. That is, the system generates an emoticon (or selects from a predefined list of emoticons) that matches the emotion being displayed by the subject of the photo. By removing the emoticon selection from the user, a more accurate emoticon can be generated/selected by the system.

In one embodiment of the present invention, the electronic chat session monitoring device receives a photo of the addressee, which is taken in response to the addressee opening the current text message, and then transmits the photo of the addressee taken in response to the addressee opening the current text message back to the initial sender. For example and as shown in FIG. 4, photos 413 of Users B-D are taken when then open/see/read User A's chat content 409, thus allowing User A to 1) confirm that they received chat content 409 and 2) see their facial expressions when they received/read chat content 409. In one embodiment and in order to capture the facial expressions of Users B-D when reading chat content 409, the system will delay the taking of the facial photos of Users B-D for a few seconds.

In one embodiment of the present invention, the electronic chat session monitoring device receives a selection of a particular type of photo taken of the initial sender, where the particular type of photo describes a particular emotion of the initial sender while generating text messages, and where the selection is generated by a requester. The electronic chat session monitoring device correlates photos of the particular type of photo with text messages that have been associated with the photos of the particular type of photo. The electronic chat session monitoring device then transmits the text messages that have been associated with the photos of the particular type of photo to the requester.

For example, assume that a chat session has been rather lengthy, such that only part of the electronic chat session is visible on the user interface. A requester may want to see all text entries from a particular participant that are associated with that particular participant being happy. Rather than having to scroll through all of the electronic chat session, the system (using the Text Messaging Processing workload 66 shown in FIG. 3 and/or similar software in a monitored system 423a in FIG. 4) pulls up all text messages that have a happy photo appended thereto, and presents these text messages to the requester.

In one embodiment of the present invention, the electronic chat session monitoring device creates a library of photos taken of the initial sender while generating text messages, and then catalogues the library of photos according to an emotion displayed by the initial sender while generating the text messages. The electronic chat session monitoring device receives a selection of a particular type of photo from the library of photos, where the particular type of photo describes a particular emotion of the initial sender while generating text messages, and wherein the selection is generated by a requester. The electronic chat session monitoring device correlates photos of the particular type of photo with text messages that have been associated with the photos of the particular type of photo, and then transmits the text messages that have been associated with the photos of the particular type of photo to the requester.

For example, rather than being interested in text messages that have a same emotional content in a single chat session, the requester may be interested in all previous chat/text messages from past chat sessions and from a particular person that reflect a same emotion. Thus, all "happy photos" are used as a correlation to "happy" text messages. If the requester asks for all past text messages that have been associated with a "happy" picture of a particular sender, then the system uses these "happy photos" to retrieve the relevant "happy" text messages.

In one embodiment of the present invention, the electronic chat session monitoring device retrieves multiple photos taken of the initial sender while generating multiple text messages during the electronic chat session, and then determines a chronology of when the multiple photos were taken. The electronic chat session monitoring device identifies an emotion associated with each of the multiple photos, and then generates an emotion arc of the initial sender during the electronic chat session based on the chronology and the emotion associated with each of the multiple photos.

For example, assume that the electronic chat session occurred over the course of several minutes or longer. Initially, the initial sender of the chat/text messages was angry, as indicated by the photos captured when he/she generated/sent the early chat/text messages. However, as the electronic chat session progressed, the initial sender's mood may have improved (e.g., due to responsive messages from other participant(s) in the electronic chat session), as indicated by the changes in the initial sender's captured facial expressions. These emotion changes define an "emotion arc", which is a trend of emotions (e.g., going from angry to happy) experienced/displayed by the participant in the electronic chat session. Such emotion arcs can be used to evaluate how effective on-line services are in resolving customer issues. Similarly, if a customer is being handed off from a tier II service representative to a tier I service representative (who has a higher level of expertise than the tier II service representative), this emotion arc is useful to the tier I service representative in determining how best to approach the customer.

In one embodiment of the present invention, the current photo of the initial sender is taken by a camera that is affixed to a device that supports the electronic chat session. The electronic chat session monitoring device determines a distance between the initial sender and the camera when the current photo was taken, and then further determines the emotion of the initial sender while generating the current text message based on the distance between the initial sender and the camera when the current photo was taken.

For example, assume that a user is holding a smart phone that has a camera (see monitored system 423*a* and camera 420 in FIG. 4). Persons will often, without even realizing it, hold a phone that is displaying a distasteful chat/text message away from themselves, in a subconscious effort to distance themselves from the unpleasant chat/text message. Conversely, people will often hold the phone closer to their face when receiving a pleasant message, in a subconscious effort to attach themselves to the pleasant message. By measuring the distance between the user and the phone/camera while reading a particular text message (e.g., using the camera 420 or a distance detector 438 shown in FIG. 4, such as a device that sends out and receives electromagnetic signals to detect a Doppler shift, and thus distances between the user and the monitored system 423*a*), the system is able to further determine, beyond what is shown in the user's photo, what the true emotion of the user is when sending/receiving a chat/text message.

In one embodiment of the present invention, the electronic chat session monitoring device categorizes a background of the current photo into a particular type of environment, matches the particular type of environment to a particular emotion that is experienced by persons in the particular type of environment, and then further determines the emotion of the initial sender while generating the current text message based on the particular type of environment that describes the background of the current photo.

For example, assume that the photo of the sender (or recipient) of a chat/text message includes a background. The background of the photo can be used to further determine what the true emotion of the sender/recipient of a particular text/chat message is. For example, assume that the background shows that the sender/recipient is in a stressful place, such as certain airports. Although the photo of the sender/recipient may show a face that is worried/stressed due to pressures associated with being in certain airports, the user may in fact be relieved by the content of the chat/text message. The present invention thus accounts for the environment/background shown in the photo in order to refine/define the true emotion of the person.

In one embodiment of the present invention, the electronic chat session monitoring device determines a typing speed of the initial sender while generating the current text message, and then further determines the emotion of the initial sender while generating the current text message based on the typing speed of the initial sender while generating the current text message. For example, if the generator of the chat/text message is typing very quickly, this may indicate the emotion of "anxiety" or feeling rushed, which may or may not appear in his/her photo. The present invention thus takes such typing speed into account when determining the true emotion of the person. If the current photo does not properly reflect this true emotion, then another photo (e.g., from a past electronic chat session) may be used as a substitute to the current photo of the chat/text message sender.

In one embodiment of the present invention, the current text message is sent from a communication device that supports the electronic chat session, and the communication device comprises a geophysical location sensor. The electronic chat session monitoring device determines a geophysical location of the communication device while the initial sender is generating the current text message, and then further determines the emotion of the initial sender while generating the current text message based on the geophysical location of the initial sender while generating the current text message. Again, assume that the sender (or recipient) of a chat/text message is in a notoriously stressful airport, as determined by a geophysical location sensor (e.g., GPS 432 shown in FIG. 4), which may not be in the background of the photo. Again, although the photo of the sender/recipient may show a face that is worried/stressed due to pressures associated with being in certain airports, the user may in fact be relieved by the content of the chat/text message. The present invention thus accounts for the environment of the user in order to refine the true emotion of the person.

In one embodiment of the present invention, a communication device (e.g., monitored system 423*a* shown in FIG. 4) represents an emotion of a participant in an electronic chat session. The communication device includes an electronic communication session transceiver (e.g., network interfaced 434 in FIG. 4), a camera (e.g., camera 420 in FIG. 4), a photo analysis hardware device (e.g., processor 416 shown in FIG. 4), a geophysical positioning hardware device (e.g., GPS 426 shown in FIG. 4), and an emotion determination device (e.g., part of processor 416 shown in FIG. 4). The electronic communication session transceiver transmits a current text message from an electronic chat session, where the current text message is generated by an initial sender, and wherein the current text message is addressed to an addressee. The camera captures and sends a current photo of the initial sender of the current text message to the addressee, where the current photo is taken contemporaneously with a generation of the current text message by the initial sender. The photo analysis hardware device determines, based on at least one previous photo taken of the initial sender while generating a past text message having a same contextual content as the current text message, whether the current photo accurately represents an emotion of the initial sender while generating the current text message. The geophysical location sensor determines a geophysical location of the communication device while the initial sender is generating the current text message. The emotion determination device further determines the emotion of the initial sender while generating the current text message based on the geophysical location of the initial sender while generating the current text message. The electronic communication session transceiver, in response to the photo analysis hardware device and the emotion determination device determining that the current photo accurately represents the emotion of the initial sender when generating the current text message, transmits both the current text message and the current photo of the initial sender to the addressee.

The present disclosure thus presents a technological improvement over the prior art that has heretofore been unavailable and/or known to those skilled in the art. More specifically, the present invention allow senders of chat/text messages to see the facial reactions of the recipients of such chat/text messages, which has heretofore been unavailable in the prior art according to embodiments presented herein.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the present invention in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present disclosure of the present application in detail and by reference to illustrative embodiments thereof, it will be apparent that modifications and variations are possible without departing from the scope of the present disclosure defined in the appended claims.

What is claimed is:

1. A method for representing an emotion of a participant in an electronic chat session, the method comprising:

intercepting, by an electronic chat session monitoring device, a current text message from an electronic chat session, wherein the current text message is generated by an initial sender at a sending device, wherein the current text message has been sent from the sending device when it is intercepted by the electronic chat session monitoring device, and wherein the current text message is addressed to an addressee at a receiving device, and wherein the electronic chat session monitoring device monitors text message traffic between the sending device and the receiving device;

receiving, by the electronic chat session monitoring device, a current photo of the initial sender of the current text message from the electronic chat session, wherein the current photo depicts the initial sender while generating the current text message, and wherein the current photo shows a facial expression of the initial sender that provides evidence of an emotional state of the initial sender while generating the current text message;

generating, by the electronic chat session monitoring device, an emotion icon (emoticon) that represents the emotion of the initial sender while generating the current text message, wherein the emoticon is a cartoon figure that is derived from the current photo of the initial sender;

appending, by the electronic chat session monitoring device, the emoticon to the current text message;

determining, by the electronic chat session monitoring device, that the emotional state of the initial sender, as evidenced by the current photo, is incongruous with a content of the current text message; and in response to determining that the emotional state of the initial sender is incongruous with the content of the current text message, rewriting, by the electronic chat session monitoring device, text in the current text message to comport with the emotional state of the initial sender while generating the current text message.

2. The method of claim 1, further comprising:

determining, by the electronic chat session monitoring device and based on at least one previous photo taken of the initial sender while generating a past text message having a same contextual content as the current text message, whether the current photo represents an emotion of the initial sender while generating the current text message; and in response to determining that the current photo represents the emotion of the initial sender when generating the current text message, authorizing, by the electronic chat session monitoring device, the transmission of both the current text message and the current photo of the initial sender to the addressee.

3. The method of claim 1, further comprising:

receiving, by the electronic chat session monitoring device, biometric sensor readings of the initial sender from one or more biometric sensors coupled to the initial sender, wherein the biometric sensor readings are taken while the initial sender is generating the current text message; and determining, by the electronic chat session monitoring device and based on the biometric sensor readings, whether the current photo represents an emotion of the initial sender while generating the current text message.

4. The method of claim 1, further comprising:

receiving, by the electronic chat session monitoring device, a photo of the addressee, wherein the photo of the addressee is taken in response to the addressee opening the current text message;

transmitting, by the electronic chat session monitoring device, the photo of the addressee taken in response to the addressee opening the current text message to the initial sender;

receiving, by the electronic chat session monitoring device, a response from the addressee; and overlaying, by the electronic chat session monitoring device, the response from the addressee over the photo of the addressee on a chat user interface that is used by the initial sender.

5. The method of claim 1, further comprising:
receiving, by the electronic chat session monitoring device, a selection of a particular type of photo taken of the initial sender, wherein the particular type of photo describes a particular emotion of the initial sender while generating text messages, and wherein the selection is generated by a requester;
correlating, by the electronic chat session monitoring device, photos of the particular type of photo with text messages that have been associated with the photos of the particular type of photo; and
transmitting, by the electronic chat session monitoring device, the text messages that have been associated with the photos of the particular type of photo to the requester.

6. The method of claim 1, further comprising:
creating, by the electronic chat session monitoring device, a library of photos taken of the initial sender while generating text messages;
cataloging, by the electronic chat session monitoring device, the library of photos according to an emotion displayed by the initial sender while generating the text messages;
receiving, by the electronic chat session monitoring device, a selection of a particular type of photo from the library of photos, wherein the particular type of photo describes a particular emotion of the initial sender while generating text messages, and wherein the selection is generated by a requester;
correlating, by the electronic chat session monitoring device, photos of the particular type of photo with text messages that have been associated with the photos of the particular type of photo; and
transmitting, by the electronic chat session monitoring device, the text messages that have been associated with the photos of the particular type of photo to the requester.

7. The method of claim 1, further comprising:
retrieving, by the electronic chat session monitoring device, multiple photos taken of the initial sender while generating multiple text messages during the electronic chat session;
determining, by the electronic chat session monitoring device, a chronology of when the multiple photos were taken;
identifying, by the electronic chat session monitoring device, an emotion associated with each of the multiple photos; and
generating, by the electronic chat session monitoring device, an emotion arc of the initial sender during the electronic chat session based on the chronology and the emotion associated with each of the multiple photos, wherein the emotion arc represents a trend of emotions of the initial sender during the electronic chat session.

8. The method of claim 1, further comprising:
categorizing, by the electronic chat session monitoring device, a background of the current photo into a particular type of environment;
matching, by the electronic chat session monitoring device, the particular type of environment to a particular emotion that is experienced by persons in the particular type of environment; and
further determining, by the electronic chat session monitoring device, the emotion of the initial sender while generating the current text message based on the particular type of environment that describes the background of the current photo.

9. The method of claim 1, further comprising:
determining, by the electronic chat session monitoring device, a typing speed of the initial sender while generating the current text message; and
further determining, by the electronic chat session monitoring device, the emotion of the initial sender while generating the current text message based on the typing speed of the initial sender while generating the current text message.

10. The method of claim 1, wherein the current text message is sent from a communication device that supports the electronic chat session, wherein the communication device comprises a geophysical location sensor, and wherein the method further comprises:
determining, by the electronic chat session monitoring device, a geophysical location of the communication device while the initial sender is generating the current text message; and
further determining, by the electronic chat session monitoring device, the emotion of the initial sender while generating the current text message based on the geophysical location of the initial sender while generating the current text message.

11. A computer program product for representing an emotion of a participant in an electronic chat session, the computer program product comprising a computer readable storage medium having program code embodied therewith, wherein the computer readable storage medium is not a transitory signal per se, and wherein the program code is readable and executable by a processor to perform a method comprising:
intercepting a current text message from an electronic chat session, wherein the current text message is generated by an initial sender at a sending device, wherein the current text message has been sent from the sending device when it is intercepted by an electronic chat session monitoring device, and wherein the current text message is addressed to an addressee at a receiving device, and wherein the electronic chat session monitoring device monitors text message traffic between the sending device and the receiving device;
receiving a current photo of the initial sender of the current text message from the electronic chat session, wherein the current photo depicts the initial sender while generating the current text message, and wherein the current photo shows a facial expression of the initial sender that provides evidence of an emotional state of the initial sender while generating the current text message;
generating an emotion icon (emoticon) that represents the emotion of the initial sender while generating the current text message, wherein the emoticon is a cartoon figure that is derived from the current photo of the initial sender;
appending the emoticon to the current text message;
determining that the emotional state of the initial sender, as evidenced by the current photo, is incongruous with a content of the current text message; and
in response to determining that the emotional state of the initial sender is incongruous with the content of the current text message, rewriting text in the current text message to comport with the emotional state of the initial sender while generating the current text message.

12. A communication device comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

intercepting a current text message from an electronic chat session, wherein the current text message is generated by an initial sender at a sending device, wherein the current text message has been sent from the sending device when it is intercepted by an electronic chat session monitoring device, and wherein the current text message is addressed to an addressee at a receiving device, and wherein the electronic chat session monitoring device monitors text message traffic between the sending device and the receiving device;

receiving a current photo of the initial sender of the current text message from the electronic chat session, wherein the current photo depicts the initial sender while generating the current text message, and wherein the current photo shows a facial expression of the initial sender that provides evidence of an emotional state of the initial sender while generating the current text message;

generating an emotion icon (emoticon) that represents the emotion of the initial sender while generating the current text message, wherein the emoticon is a cartoon figure that is derived from the current photo of the initial sender;

appending the emoticon to the current text message;

determining that the emotional state of the initial sender, as evidenced by the current photo, is incongruous with a content of the current text message; and in response to determining that the emotional state of the initial sender is incongruous with the content of the current text message, rewriting text in the current text message to comport with the emotional state of the initial sender while generating the current text message.

* * * * *